(12) United States Patent
Bruennel

(10) Patent No.: US 7,134,205 B2
(45) Date of Patent: Nov. 14, 2006

(54) METHOD FOR PRODUCING BUTTONS, ORNAMENTAL AND INSTRUMENT PANELS WITH FINE SYMBOLS, AND A BUTTON PRODUCED WITH THE METHOD

(75) Inventor: Elmar Bruennel, Lindau/Bodensee (DE)

(73) Assignee: Angell Demmel Europe GmbH, Lindau (DE)

( * ) Notice: Subject to any disclaimer, the term of this patent is extended or adjusted under 35 U.S.C. 154(b) by 69 days.

(21) Appl. No.: 10/793,397

(22) Filed: Mar. 4, 2004

(65) Prior Publication Data

US 2005/0061111 A1    Mar. 24, 2005

(30) Foreign Application Priority Data

Aug. 29, 2003   (DE)   ................. 103 39 842

(51) Int. Cl.
- B21D 53/48   (2006.01)
- H01H 13/14   (2006.01)
- B41J 5/12    (2006.01)

(52) U.S. Cl. .................. 29/896.5; 29/17.1; 29/17.2; 29/527.4; 79/3; 200/314; 200/317; 264/132; 400/490; 400/494

(58) Field of Classification Search ............... 29/896.5, 29/17.1, 17.2, 527.4; 79/3; 200/314, 317, 200/514; 264/132; 400/490, 494

See application file for complete search history.

(56) References Cited

U.S. PATENT DOCUMENTS

| | | | |
|---|---|---|---|
| 5,477,024 A * | 12/1995 | Share et al. | ........... 219/121.69 |
| 5,911,317 A | 6/1999 | Tsai | |
| 6,180,048 B1 | 1/2001 | Katori | |
| 6,762,381 B1 * | 7/2004 | Kunthady et al. | .......... 200/512 |
| 6,770,212 B1 * | 8/2004 | Hayashizaki | .................. 216/28 |
| 6,849,226 B1 * | 2/2005 | Ardrey et al. | ............... 264/514 |
| 2003/0108720 A1 * | 6/2003 | Kashino | ...................... 428/189 |
| 2003/0116414 A1 | 6/2003 | Maeda | |
| 2003/0202337 A1 * | 10/2003 | Yin et al. | ...................... 362/29 |
| 2005/0168966 A1 | 8/2005 | Maeda | |

FOREIGN PATENT DOCUMENTS

| | | |
|---|---|---|
| DE | 3509519 | 9/1986 |
| DE | G 90 10 784.5 | 11/1990 |
| DE | 4324625 | 1/1995 |
| DE | 10123344 | * 12/2002 |
| EP | 1248275 | 9/2002 |
| EP | 1321955 | 6/2003 |
| GB | 2279915 | 1/1995 |

(Continued)

*Primary Examiner*—Eric Compton
(74) *Attorney, Agent, or Firm*—Norris McLaughlin & Marcus, PA

(57) ABSTRACT

A button, knob or control key with an etchable support plate which is engraved on the backside with a fine symbol by laser, erosion or mechanical engraving, which only cuts into the material of the support plate, but not through the support plate. The backside of the support plate is optionally coated. A foil is applied on the laminated layer and affixed thereto. The front side of the support plate is treated with a material-removing substance. The material removal with the material-removing substance is performed until the engraving extending into the support plate is at least partially or completely exposed on the front side. Application of a protective layer to the front side of the support plate from which the material was removed. A function symbol is provided on the button such that it can be backlit. It is engraved in a fine line width providing a sharp optical definition erosion, mechanical engraving.

14 Claims, 2 Drawing Sheets

FOREIGN PATENT DOCUMENTS

| | | | |
|---|---|---|---|
| JP | 11-167838 | * | 6/1999 |
| JP | 2001-073154 | * | 3/2001 |
| JP | 2002-117741 | * | 4/2002 |
| JP | 2002-216573 | * | 8/2002 |
| JP | 2004-063157 | * | 2/2004 |

* cited by examiner

METHOD FOR PRODUCING BUTTONS, ORNAMENTAL AND INSTRUMENT PANELS WITH FINE SYMBOLS, AND A BUTTON PRODUCED WITH THE METHOD

BACKGROUND OF THE INVENTION

1. Field of the Invention

The present invention relates to a method for producing buttons, control keys, ornamental and instrument panels with fine symbols and to a component produced with the method. The described buttons are often found in instrument panels of automobiles; however, buttons of this type can generally also be employed as control keys or buttons, for example, with electronic equipment.

The following description describes the production of a button as one exemplary embodiment. However, this is not to be understood as a limitation, because the method can not only be used to process buttons and control keys, but also ornamental and instrument panels. The process of fabricating a button is described only to simplify the explanation, and the term button will hereinafter be used synonymously and interchangeably with control keys or other types of operating buttons, such as control knobs.

2. Description of the Related Art

A large number of devices with buttons are nowadays installed in the interior space of an automobile. These buttons have a plastic surface that is identified with a diagrammatic functional symbol. Until now, such buttons were entirely made of plastic which is coated with a laser-processable varnish. The functional symbols are subsequently transferred by laser engraving to the surface of the buttons. For visually enhancing of the interior of motor vehicles, it was deemed desirable to provide these buttons with a genuine metallic surface with a design that can be coordinated with the surfaces of other employed ornamental parts. It has not been possible until now to produce a button surface with this type of design.

The conventional method has the disadvantage that very fine symbols defined on the button could not be applied to metallic surfaces.

The very narrow line width of the symbol contour affects the thickness of an aluminum sheet metal, for example, that can be employed, because arbitrary thickness-width ratios could not be obtained with conventional processing methods (punching, engraving, etching). In addition, it proved difficult to precisely position the unattached interior symbol portion(s) which becomes even more difficult with narrower line widths. The requirement to coordinate the visual effect with the surfaces of surrounding components also limits the use of alternative metallization methods.

One approach has been to punch the symbols out of an aluminum plate or another metallic support plate. However, a punching process is disadvantageously coarse. When the function symbol is punched in an aluminum sheet, the line widths of the symbol contour have to be commensurate with the sheet metal thickness.

In addition, burrs resulting from the punching process have to be tolerated since they are difficult to remove. Also, residual section can remain on the button after the punching operation, in particular when areas are surrounded by a closed contour line. Therefore, care had to be taken that no unattached areas on the symbols were punched out, because such areas would otherwise fall out. This limits the shape of the punched-out sections.

It is known to cut symbols out of an aluminum support plate using a cutting beam/jet (e.g., laser beam or high-pressure water jet). However, this exhibited the same disadvantages, name a relativity coarse cutting profile with undesirable cutting edges, burrs and support webs.

If the symbol contour is cut out with a laser, then the burr and burned sections appear on the visible side of the decor.

It is also known to remove such symbols from the support plate by chemical etching. This has the disadvantage that the etched line width has to be always twice the material thickness, which prevents the application of fine symbols on a button.

Alternative metallization processes are, for example galvanic coating or coating by physical vapor deposition (PVD). However, the color and the appearance of the decor can only be adapted to the surrounding surfaces in a limited way.

In any case, after the individual inner contours of the function symbol are cut out, an accurate registration to the outer contour is required for further processing (forming operation, molding). However, the required support elements must not produce pressure points or otherwise damage the decor surface, and the position of the interior portion must not move relative to the outer contour due to mold filling during the molding phase or shrinkage during the cooling phase. In order to prevent the inner contour from being completely unattached, support webs have to be provided which can adversely affect the visual appearance of the inner contour and are therefore not acceptable for visual reasons.

SUMMARY OF THE INVENTION

It is therefore an aspect of the invention to improve a method and provide buttons, keys, as well as ornamental and instrument panels produced with this method, so that fine symbols can be applied to the button, which can optionally also be backlit, without the risk of having remaining portions of the plate material that are enclosed by cut-out symbols fall accidentally out of the plate.

The aforedescribed object of the invention is solved by a method characterized by the technical teachings of claim 1.

With respect to a component produced with the method, the object of the invention is realized by a button, ornamental and instrument cover that can be backlit, on a plastic support with a genuine metallic surface which has an arbitrary function symbol with an unattached interior portion. The backlit contour of the function symbol should be represented by a fine line width.

The object of providing the device of the invention is solved in that the button is made of a plastic-aluminum composite material that forms a moldable shell with the exact contour for producing the body of the button.

The invention for producing the fine function symbol is embodied in the combined application of laser engraving, etching as well as printing and lamination processes.

Basically, the following method steps are carried out:

1. An engravable and etchable support plate is provided on the backside with a fine symbol using an engraving method (laser, erosion, mechanical engraving), wherein the engraving extends only into the material of the support plate, but does not penetrate the support plate itself.

The engraving in the support plate should be as deep as possible, but should not protrude out of the plate beyond the front side (e.g., opposite the laser beam).

2. The support plate is laminated on the backside.

According to a preferred embodiment of the lamination process, a laminating ink is applied. However, other coating methods can be used, such as application of a colored foil, for example by using a backing layer without a bonding agent or printing of the backside with a printing ink which can have multiple colors.

This layer is provided as a bonding agent for a foil to be applied later, in the third method step.

If lamination takes place without a bonding agent (e.g., on open-pore support sheets), then the lamination foil can alternatively be printed. The step of coating the support plate is thereby eliminated.

3. A foil is applied on the laminated layer or on the support plate and affixed thereto.
4. In a material-removing process, the front side of the support plate is treated with a material-removing substance. Such material-removing substance is, for example, an etchant or an electro-erosive or electrochemical removal process (e.g., by electrolysis) or the like. If material is removed by an abrasive process, then the front side can simultaneously receive a directional decor.
5. The material removal with the material-removing substance occurs until the engraved portion is at least partially or completely exposed on the front side.
6. After the material has been removed, a protective layer is applied on the front side of the support plate from which the material was removed. The protective layer can be, for example, a protective varnish, Eloxal, PVD, CVD or the like.

The protective layer can be applied, for example, by coating (sputtering) in vacuum. Alternatively, varnish layers or other suitable thin layers suitable to seal and/or decorate the front side (viewable side) can be printed, molded or applied in other ways.

A component produced with this process, e.g., a button with fine symbols, has the advantageous feature that the fine line width and fine engraving width of the fine symbols is now visible on the front side of the support plate, with the line widths being preferably in a range as small as approximately 0.1 mm. Although smaller line widths can be produced with the method of the invention, they are no longer readily visible, so that an engraved line width of approximately 0.1 mm is preferred. Greater line widths are only limited by the physical dimension of a button.

The method has the advantage that the support plate can now be easily backlit and that the finely engraved function symbols, when illuminated, can be easily viewed with excellent edge definition.

Accordingly, material must no longer be removed near the edges of the engraved line, as has been required until now when punching or etching from the viewable side. The engraved lines have now sharp edges and therefore a crisp optical definition.

Importantly, regions that are unattached following the engraving process need no longer be connected to the remaining surface of the support plate by webs or other connection means, because the unattached regions are already exactly positioned in the support plate and are fixedly connected with the support plate, thus eliminating the risk that these regions may fall out.

When using conventional punching tools, the unattached regions always have to be connected with the remaining area of the support plate by webs to prevent these regions from falling out. This is no longer required with the invention, because the unattached regions remain anchored in the support plate since they are bonded on the backside to the laminating ink or foil.

The subject matter of the present invention is not only represented by the subject matter recited in the individual claims, but also by the combination of the various claims.

All elements and features disclosed in the application papers—including the summary—, in particular the spatial configuration depicted in the drawings, are claimed as part of the invention, as long as they are novel in view of the state of the art, either alone or a combination.

Other aspects of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the following, the invention is described in more detail with reference to an embodiment depicted in the drawings. Additional features and advantages of the invention are evident from the drawings and their description.

In the drawings, wherein like reference numerals delineate similar elements throughout the several views:

FIG. 1 shows a top view on the viewable side of a button 12 with a fine backlit function symbol 2 fabricated as an engraved line 3.

DETAILED DESCRIPTION OF THE PRESENTLY PREFERRED EMBODIMENTS

The button 12 is produced by first laser-engraving the backside of a support plate 1 which can have an arbitrary thickness. The support plate 1 in the present example is an aluminum sheet with a preferred sheet thickness between 0.2 and 0.5 mm.

Figure 2:
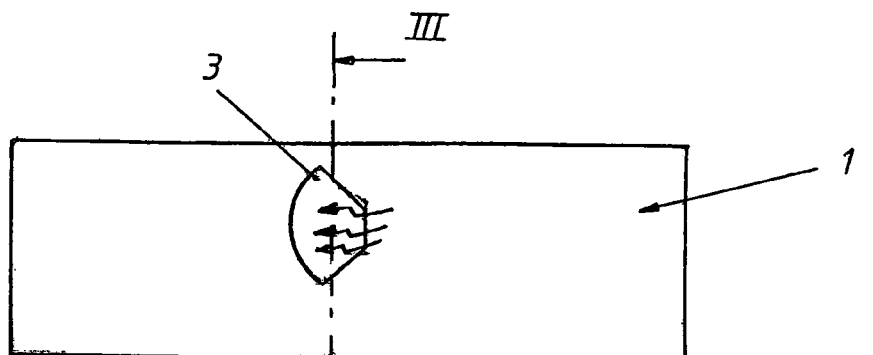
FIG. 2 a top view on the backside of an aluminum plate with a laser engraving.

According to FIG. 2, the engraved line 3 for the function symbol 2 is transferred to the support plate 1 with a very fine line width (e.g., 0.15 mm line width for a 0.5 mm thick metal sheet).

Figure 3:
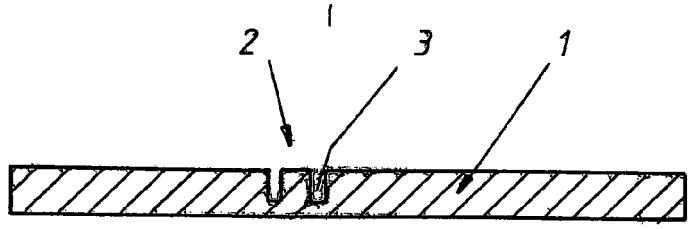
FIG. 3 a cross-section taken along the line III—III of FIG. 2.

However, the laser does not cut completely through the metal sheet, but only applies a deep engraving with a depth that leaves a residual wall thickness of approximately 0.01 mm in the support plate. This is shown in FIG. 3.

It is important to engrave the backside of the support plate 1, since all process-related surface blemishes (burr formation, burned material) are then located in the invisible area of the subsequently produced button.

Figure 4:
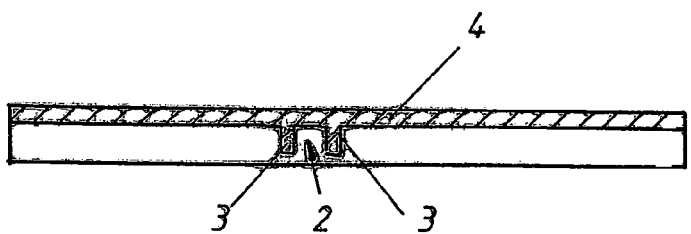
FIG. 4 a cross-section through the plate according to the second process step.

Thereafter, the surface of the aluminum sheet is etched (by degreasing, pre-treatment for printing) and coated with a laminating ink 4, as shown in FIG. 4. The engraved line 3 produced by the laser engraving process is hereby at least partially filled in.

The laminating ink (transparent or pigmented) serves as a bonding agent to a plastic foil 5, which can also be transparent or colored. Laminating the plastic foil to the backside of the aluminum sheet produces a composite material which can be processed by etching. The laminating ink 4 can be eliminated when using open-pore support sheets.

Figure 5:
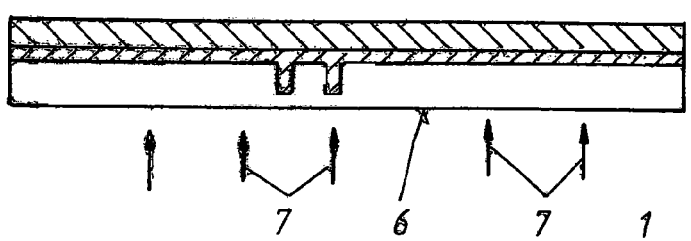
FIG. 5 a cross-section through the plate according to the third process step.
Figure 6:
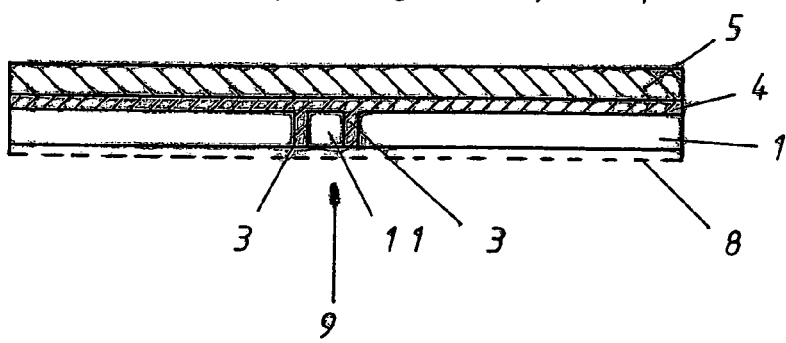
FIG. 6 a cross-section through the plate according to the fourth process step.

As depicted in FIG. 5, the aluminum-plastic composite is immersed in an etching bath until the residual wall thickness of the aluminum is removed by the reaction with the etchant 7 and the engraved symbol shown in FIG. 6 is exposed. A protective layer 8 covering to the exposed engraved section is applied to the viewable side. The thickness of the support plate 1 was reduced by the etching step, forming the residual support plate 1'.

In this way, a flat aluminum-plastic composite is produced which includes function symbols 2, which can be backlit and have a fine line contour and precisely positioned unattached regions 11. Because the back sides of the unattached regions 11 are still bonded to the lamination layer, they cannot fall out. Moreover, connecting webs to the surrounding material are no longer necessary.

The front side of this composite can be decorated in any desirable fashion by applying transparent, semi-transparent, colored and/or printed layers.

Figure 1:
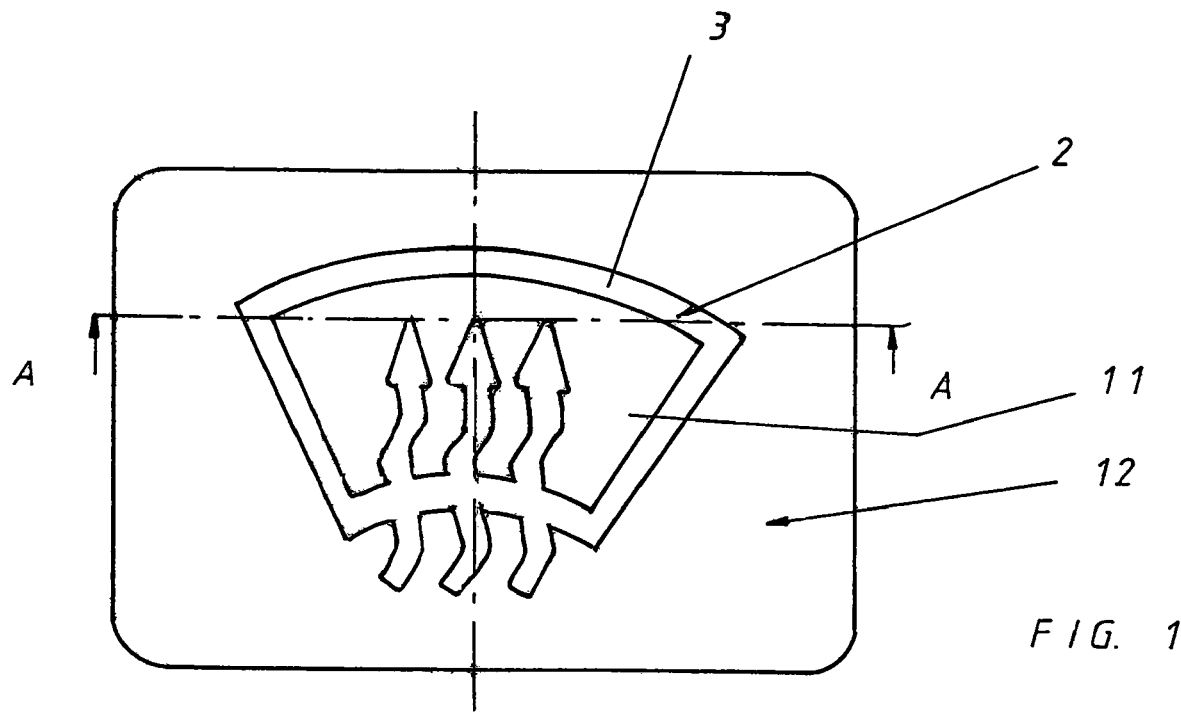
FIG. 1 a top view on the viewable side of the button.
Figure 7:
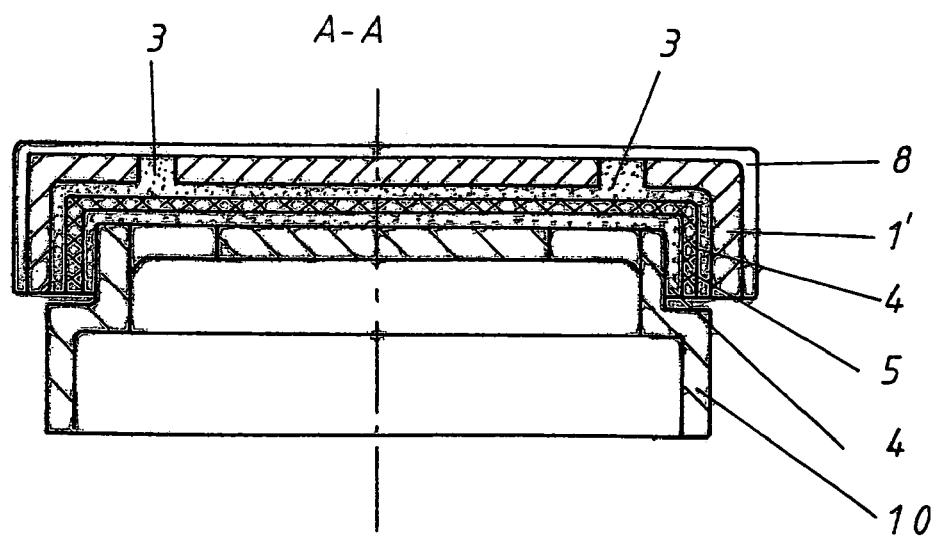
FIG. 7 a cross-section through the finished button taken along the line A—A of FIG. 1.

Additional functional layers (e.g., bonding agents) can be applied to the backside in order to facilitate direct molding of the button body represented by the plastic carrier 10 depicted in FIG. 7. For this purpose, the buttons are typically separated into individual units, forming a shell with a precise contour, which is inserted into the injection mold.

The method can also be applied to the production of gear shift lever clasps and selector switch clasps, as well as for buttons, knobs, control keys, ornamental and instrument panels with unattached symbols.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for producing buttons, knobs, control keys, ornamental and instrument panels with an integrated symbol, comprising the steps of:
    (a) providing a support plate having a front side and a back side, wherein the backside is engraved to a depth extending partly into the support plate such that it does not penetrate the support plate entirely;
    (b) affixing a foil onto the back side of the support plate;
    (c) treating the front side of the support plate with a material-removing medium, to partly remove the front side of the support plate;
    (d) allowing the material-removing to occur until the engraved portion is at least partially exposed on the front side,
    (e) applying a protective layer to the front side of the remaining support plate.

2. A method for producing buttons, knobs, control keys, ornamental and instrument panels with an integrated symbol, comprising the steps of:
    (a) providing a support plate having a front side and a back side, wherein the backside is being engraved to a depth extending partly into the support plate such that it does not penetrate the support plate entirely;
    (b) coating the backside of the support plate with a lamination layer;
    (c) affixing a foil directly on the lamination layer;
    (d) treating the front side of the support plate with a material-removing medium, to partly remove the front side of the support plate;
    (e) allowing the material-removing to occur until the engraved portion is at least partially exposed on the front side,
    (f) applying a protective layer to the front side of the remaining support plate.

3. The method according to claim 1, comprising a further step of
    (f) molding a plastic support to the backside of the support plate.

4. The method according to claim 2, wherein the lamination layer is a laminating ink.

5. The method according to claim 2, wherein the lamination layer is a laminating ink.

6. The method according to claim 2, wherein the lamination layer is applied by a printing process.

7. The method according to claim 2, wherein the lamination layer is applied by a printing process.

8. The meted according to claim 2, wherein the lamination layer comprises a single color.

9. The method according to claim 2, wherein the lamination layer comprises a single color.

10. The method according to claim 2, wherein the lamination layer comprises a single color.

11. The method according to claim 2, wherein the lamination layer comprises multiple colors.

12. The method according to claim 1, wherein the material removing comprises one of an etching process, an electrolytic process an electro-erosive or an abrasive process.

13. The method according to claim 2, wherein the materiaj removing comprises an electrolytic process or an electro-erosive or an abrasive process.

14. The method according to claim 2, comprising a further step of
    (g) molding a plastic support to the backside of the support plate.

* * * * *

UNITED STATES PATENT AND TRADEMARK OFFICE
CERTIFICATE OF CORRECTION

| | |
|---|---|
| PATENT NO. | : 7,134,205 B2 |
| APPLICATION NO. | : 10/793397 |
| DATED | : November 14, 2006 |
| INVENTOR(S) | : Elmar Bruennel et al. |

Page 1 of 1

It is certified that error appears in the above-identified patent and that said Letters Patent is hereby corrected as shown below:

Column 6, Line 38 "The meted" should read --The method--

Column 6, Line 50, "the materiaj" should read --the material--

Column 6, Lines 30-33, Claims 4 and 5 are identical. Please delete claim 5 and renumber the claims.

Column 6, Lines 34-37, Claims 6 and 7 are identical. Please delete claim 7 and renumber the claims.

Column 6, Lines 38-43, With the exception of the typographical error in Claim 8, Claims 8, 9 and 10 are identical. Please delete claims 9 and 10, and renumber the claims.

Signed and Sealed this

Twentieth Day of March, 2007

JON W. DUDAS
*Director of the United States Patent and Trademark Office*